Nov. 11, 1952  G. M. TRUMBULL  2,617,464
TIRE CHAIN FASTENER
Filed April 5, 1948

INVENTOR
GEORGE M. TRUMBULL
By Pearson + Pearson
ATTORNEY

Patented Nov. 11, 1952

2,617,464

UNITED STATES PATENT OFFICE 2,617,464

TIRE CHAIN FASTENER

George M. Trumbull, West Newton, Mass.

Application April 5, 1948, Serial No. 18,922

9 Claims. (Cl. 152—233)

This invention relates to motor vehicle tire chains and particularly to a device for fastening cross chains to side chains thereof.

It has been customary to join cross chains to side chains by a permanent link which must be removed by a tool capable of spreading the malleable link ends. Therefore, when a link of the cross chain breaks, while mounted on a tire, the two ends of the cross chain are thrown outwardly by centrifugal force, striking the undercarriage of the vehicle and sometimes causing damage. Usually the driver must bring his vehicle to a complete stop, insert what is known as a "monkey" link to reconnect the ends of the chain or he must pry off the broken cross chains or remove the entire chain from the tire.

It has been proposed to have a manually detachable fastening device between the cross and side chains such as shown in patent to Seabo, No. 2,197,881, dated April 23, 1940, whereby the driver can stop his car and release the broken cross chains. It is an object of my device to avoid the necessity of complete stopping of the vehicle and to avoid any necessity of reaching around underneath the vehicle and behind the tire to release the interior cross chain.

It has also been proposed to provide a ball and socket connection between cross chain and side chain as described in patent to Gray, No. 1,419,043, dated June 6, 1922.

However the purpose of the ball and socket connection of Gray is apparently only for ease of installation of his zigzag cross chain. A break in a link of his tread chain would not cause the loose ends of the tread chain to be discharged as is the essential feature of my device.

My invention is an improvement on previous chain fastening devices in that my headed swivel member has a very short neck so that the head can not fall out of the socket by mere release of pressure. The walls of the slot in my socket member make a close sliding fit with the neck of the swivel so that the swivel head or ball is released only when the swivel neck has revolved through an arc of at least ninety degrees. Furthermore, my socket member is substantially bottomless, having a large discharge opening between the side walls and between the two hook members which attach the socket to the side chain. The hooks are separated a sufficient distance so that there is no interference when the swivel head is discharged from the socket.

By the use of my new fastening member, the cross chains are held in place until a link in the cross chain breaks. Upon such breakage the two ends of the cross chain fly out by centrifugal force, the accompanying noise warning the driver, who brings his vehicle down to walking speed. The slower speed reduces the effect of centrifugal force sufficiently to permit gravity to draw the ends of the cross chain downwardly when they are at the top of the tire. The broken cross chains cause the swivel neck to revolve downwardly in the socket slot along a curved quadrantal path and cause the swivel head to fall completely out of the socket onto the ground.

Upon thus automatically discharging the broken cross chains during the period of reduced speed, the driver may thus resume his usual speed without the annoyance of the sound of chain striking fender and without the danger of damage to the underneath path of the vehicle. Since the vehicle is at a walking speed when the discharge of the chain end takes place there is no danger to pedestrians or other vehicles of parts flying out and striking them.

In order to keep the socket members of my device in an upright position, I prefer to provide hooks of bendable metal which are firmly fixed to the upper portion of one of the links of the side chain. I may also attach a hook from the well known type of tightening spring to the lower portion of the same link of the side chain to provide a radial pull which keeps the link and attached socket upright. I provide a flat back to the socket having a lower portion extending well below the hooks to press against the tire wall and prevent the socket from revolving around the side chain link and assuming an undesirable position.

An additional feature of my device is the ease with which new cross chains can be installed while the tire chains are mounted on a tire. Instead of having to reach under the car with a tool, unbend an old link and bend a new link into place, with my device it is merely necessary to insert the head of the swivel into the socket slot on each side of the tire.

In the drawings, Fig. 1 is a front elevation of my swivel and socket.

Figure 1:
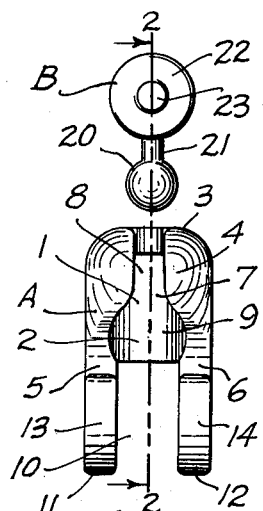
Figure 2:
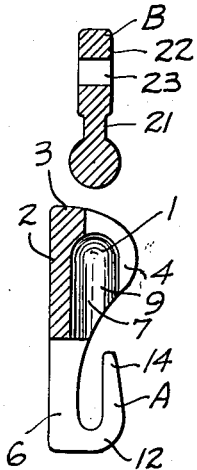
Fig. 2 is a side view in section on line 2—2 of Fig. 1.
Figure 3:
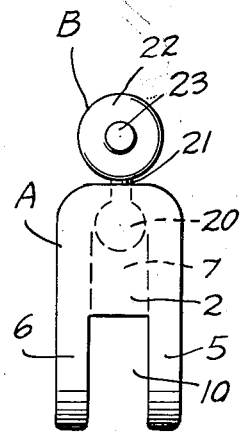
Fig. 3 is a rear elevation of the device shown in Fig. 1, with the swivel in position in the socket.

As shown in Figs. 1 to 7, my socket member A consists of a body 1 having a back 2, a top 3, a front 4, and sides 5 and 6, for an interior compartment 7. I provide a slot 8 in A with parallel sides extending from the centre of top 3 in a curve downwardly through the middle of the front 4 and merging in an enlarged opening 9.

Figure 4:
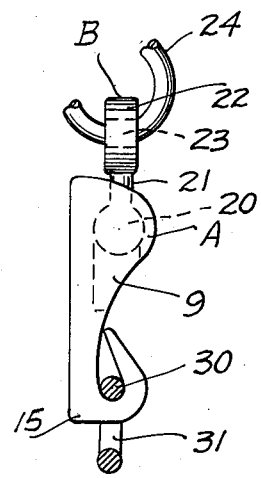
Fig. 4 is a side elevation of the device shown in Fig. 3.

The lower portion of back 2 is cut away as at 10 and the lower portions of sides 5 and 6 are bent at 11, 12, to form hooks 13 and 14. Hooks 14 and 13 are malleable and can be bent around a link 30 of side tire chain 31 as shown in Fig. 4. I prefer to bend them with sufficient force to cause hooks 13 and 14 to firmly grasp one side of link 30 whereby socket A will remain upright while link 30 is in the position shown in Fig. 4. However, the lower portion 15 of back 2 extends below the portion of link 30 grasped by hooks 13 and 14 and also prevents socket A from revolving around link 30 into an undesirable position.

The swivel B of my device consists of a head 20, preferably of ball shape and attached by a neck 21 to an eye 22 having a link hole 23 for a cross chain link such as 24 as indicated in Fig. 4. The neck 21 is short and makes a close fit with the walls of slot 8 of socket member A so that the swivel B can only be removed from socket A by revolving it through an arc of at least ninety degrees. The release of tension on the swivel thus does not cause it to fall more deeply into compartment 7 risking the possibility of an accidental discharge of the swivel from the socket. Only when the pull from cross chain link 24 is from below can the swivel B be revolved through slot 8 and the head 20 discharged from compartment 7, thus freeing a broken cross chain.

Figure 5:
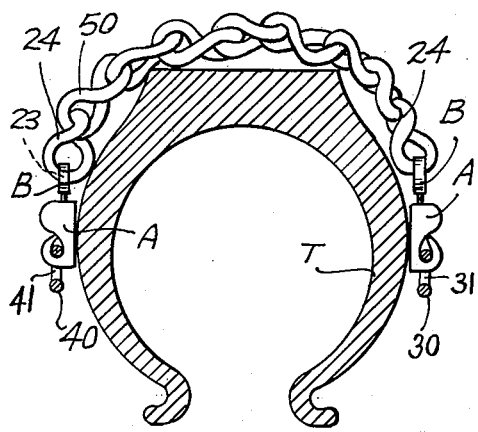
Fig. 5 is a cross sectional view of an automobile tire with my device in place.

Fig. 5 shows a tire T in cross section having side chains 41 and 31, each having a side chain link 40 and 30, to which sockets A are firmly attached. A cross chain 50 has terminal links 24, 24 fixed in holes 23 of swivels B and swivels B are held in sockets A in the manner shown in Fig. 3 and Fig. 4. It is apparent that so long as cross chain 50 is in place, the pull on swivels B will be from above and they cannot disconnect from sockets A and side chain links 40 and 30.

Figure 6:
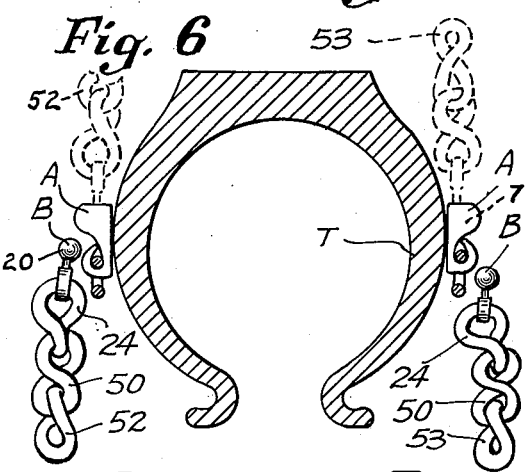
Fig. 6 is a view similar to Fig. 5, showing the action of my device after the breaking of a cross chain and the slowing down of the vehicle.

However, as shown in Fig. 6, when a link of cross chain 50 breaks, the ends 52 and 53 fly outwardly due to centrifugal force in the path shown in dotted lines. It is in this position that the broken cross chains do damage to the vehicle, causing noise and repeatedly hammering the wheel housing.

Upon slowing the vehicle to about a walking speed the centrifugal force effect dies down and gravity causes the broken chain ends 52 and 53 to fall into the position shown in Fig. 6 when they are revolved to the top of the tire. As indicated, the swivel head 20 is discharged from compartment 7 of socket A and each broken chain falls to the ground.

Figure 7:
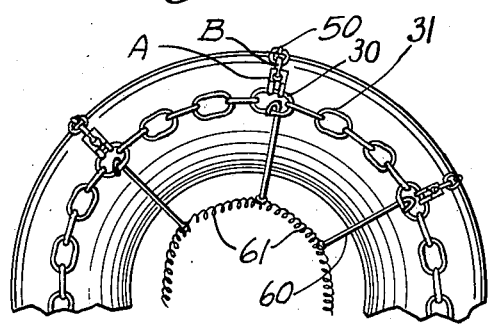
Fig. 7 is a side elevation of an automobile tire showing a tire chain with my device and showing the mounting of the sockets in association with a spring tightening device.

Fig. 7 shows my device in place on a tire T, having cross chains 50 and side chains such as 31 and 41, each socket A being fixed to a link such as 30 or 40 thereof. I prefer to attach the hooks 60 of coil spring members 61, of a well known construction, to each link 30 in the manner shown, thus exerting a pull from below on the link and causing socket A to remain in the desired position.

Figure 8:
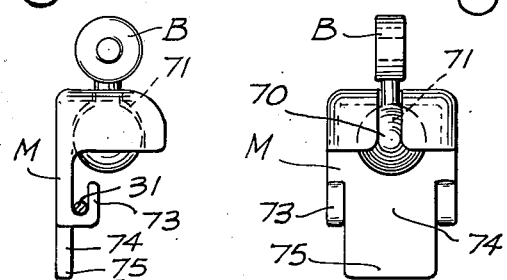
Fig. 8 is a side elevation.
Figure 9:
Fig. 9 is a front elevation of a modified form of my socket and swivel.

However, I may use a modified form of my device shown in Figs. 8 and 9, in which a swivel B is held by a socket member such as M. Socket M has a slot 70, similar to 8, and a compartment 71 for retaining the swivel head. Hooks 73, 73 are formed near the centre of back 74 for attachment to a side chain link such as 30 and are spaced well apart to avoid interfering with the discharge of the swivel head. Back 74 is extended downwardly at 75 to bear against the side wall of a tire, such as T and thus prevent M from revolving around link 30.

I claim:

1. In an automobile tire chain mounted on an automobile tire said tire chain having cross chain elements each terminating in a headed swiveling member, the combination of side chain elements having a plurality of socket members each having a compartment for a swivel head and each having a swivel slot extending from the top of said compartment downwardly along a ninety degree arc in a direction opposite to the direction of the adjacent portion of the cross chain and ending in a discharge opening.

2. In an automobile tire chain having side chain elements including a plurality of swivel sockets each having a swivel slot extending from the top of said socket downwardly along a curved path forming about a ninety degree arc to an opening, the combination of a cross chain element having a swiveling member at each end comprising a head detachably removable from said socket and a short neck closely fitting said slot.

3. A device for connecting cross chains to side chains comprising a headed member at each end of each cross chain and holding sockets for said headed members on said side chains each socket having a head releasing slot extending from the top of said socket downwardly in a curved path through an arc of about ninety degrees and terminating in a head discharge opening.

4. A device for fastening cross tire chains to side tire chains comprising a socket member fixed to a side tire chain, said socket member having a compartment for the ball of a ball member and having a key hole slot through the wall of said compartment for the neck of said ball member and a ball member fixed to a cross tire chain, said ball member having a neck, of substantially the same length as the depth of the walls of the key hole slot, engaged in said slot and having a ball engaged in said socket.

5. A device for fastening cross tire chains to side tire chains comprising a socket member fixed to a side tire chain, said socket member having a compartment for the ball of a ball member and having a key hole slot through the wall of said compartment for the neck of said ball member and a ball member fixed to a cross tire chain, said ball member having a neck, of substantially the same length as the depth of the walls of the key hole slot, engaged in said slot and having a ball engaged in said socket, said socket member being detachably connected to a link of said side tire chain by integral hooks of bendable metal spaced apart on each side of said socket a greater distance than the diameter of said ball.

6. A device for fastening cross tire chains to side tire chains comprising a socket member fixed to a side tire chain, said socket member having a compartment for the ball of a ball member and having a key hole slot through the wall of said compartment for the neck of said ball member and a ball member fixed to a cross tire chain, said ball member having a neck of substantially the same length as the depth of the walls of the key hole slot engaged in said slot and having a ball engaged in said socket, said key hole slot curving downwardly from the top of said socket in a quadrantal path to a ball discharge opening.

7. A device for fastening cross tire chains to side tire chains comprising a socket member fixed to a side tire chain, said socket member having a compartment for the ball of a ball member and having a key hole slot through the wall of said compartment for the neck of said ball member and a ball member fixed to a cross tire chain, said ball member having a neck, of substantially the same length as the depth of the walls of the key hole slot engaged in said slot and having a ball engaged in said socket, said socket compartment being of inverted cup shape with the rim of the cup forming a ball discharge opening.

8. In an automobile tire chain having cross chain elements each terminating in a headed swiveling member, the combination of side chain elements having a plurality of socket members, each having a compartment for a swivel head said compartment having a back, two sides and a downwardly curved top and front portion and each having a continuous swivel slot in said top and front portion, extending radially of said tire to a swivel head discharge opening in the socket member.

9. A device for detachably holding an end link of a cross tire chain to a link of a side tire chain when mounted on a vehicle tire comprising a ball member attached to one of said links and a ball socket member attached to the other of said links, said socket member having means operable by the weight of a broken cross chain, for detaching said ball member.

GEORGE M. TRUMBULL.

REFERENCES CITED

The following references are of record in the file of this patent:

UNITED STATES PATENTS

| Number | Name | Date |
| --- | --- | --- |
| 1,478,059 | Pye | Dec. 18, 1923 |
| 1,495,168 | Drew | May 27, 1924 |
| 1,618,938 | Marshall | Feb. 22, 1927 |
| 2,182,439 | Kalbfell | Dec. 5, 1939 |
| 2,308,904 | Wood | Jan. 19, 1943 |
| 2,444,462 | Morton | July 6, 1948 |

FOREIGN PATENTS

| Number | Country | Date |
| --- | --- | --- |
| 56,702 | Norway | June 15, 1936 |